United States Patent [19]

Kawai et al.

[11] Patent Number: 4,550,379

[45] Date of Patent: Oct. 29, 1985

[54] METHOD OF ELECTRIC POWER PLANT OPERATION

[75] Inventors: Kensuke Kawai, Higashimurayama; Shuntaro Tanaka, Musashino, both of Japan

[73] Assignee: Tokyo Shibaura Denki Kabushiki Kaisha, Kawasaki, Japan

[21] Appl. No.: 504,401

[22] Filed: Jun. 15, 1983

[30] Foreign Application Priority Data

Jun. 18, 1982 [JP] Japan .................. 57-103941

[51] Int. Cl.$^4$ ............................................. G06F 15/56
[52] U.S. Cl. ................................................... 364/494
[58] Field of Search ............... 364/494, 492, 570, 571; 290/40 R

[56] References Cited

U.S. PATENT DOCUMENTS

| 4,013,877 | 3/1977 | Uram et al. | 364/492 X |
| 4,118,635 | 10/1978 | Barrett et al. | 364/492 X |
| 4,181,950 | 1/1980 | Carter | 364/492 |
| 4,264,960 | 4/1981 | Gurr | 364/492 |
| 4,324,987 | 4/1982 | Sullivan, II et al. | 364/492 X |
| 4,337,401 | 6/1982 | Olson | 364/492 X |
| 4,354,241 | 10/1982 | Barello | 364/492 |
| 4,410,950 | 10/1983 | Toyoda et al. | 364/492 X |

Primary Examiner—Edward J. Wise
Attorney, Agent, or Firm—Schwartz, Jeffery, Schwaab, Mack, Blumenthal & Evans

[57] ABSTRACT

A machine-implemented method of operating a thermal power generating plant having at least one power generating unit comprises (A) determining, in accordance with a given time point $t_1$ at which the power generating unit is to become capable of load control and assumed time length $T_1$ for time length of initial load holding TINT, a predicted value $t'_{PI}$ of a time point $t_{PI}$ of parallel-in, a predicted value $t'_{GT}$ of a time point $t_{GT}$ of a gas turbine start; and a predicted value $t'_{INC}$ of a time point $t_{INC}$ of initial load hold completion; and (B) correcting the predicted values $t'_{PI}$, $t'_{GT}$ and $t'_{INC}$ by adding $k(t_1-t'_{INC})$ to $t'_{PI}$, $t'_{GT}$ and $t'_{INC}$, respectively, k being a given value satisfying $0 < k \leq 1$.

15 Claims, 8 Drawing Figures

METHOD OF ELECTRIC POWER PLANT OPERATION

BACKGROUND OF THE INVENTION

This invention relates to a method of operating an electric power plant, particularly useful for operation of an electric power plant comprising a plurality of combined-cycle power generating units.

Recently, combined-cycle power generating units are widely used for improving the power generating efficiency of a power plant. A combined-cycle power generating unit comprises a gas turbine and a steam turbine which are coupled in tandem such that the heat of the exhaust gas delivered from the gas turbine is used for generating steam for driving the steam turbine. Although the power generating efficiency of the unit is much higher than that of an ordinary thermal power plant because the heat of the exhaust gas of the gas turbine is reused for generating steam, the unit has a shortcoming in that the unit capacity thereof is, at present, not more than a fraction of the unit capacity of a thermal power generating unit.

It is generally desirable that capacity (unit capacity) of a single power plant connected to a power transmission system of a large capacity is large, because building a number of smaller-capacity plants with the same total capacity is more costly and less efficient. A further ground for preference of larger unit capacity plant is the increasing power demand on the power transmission system.

In order to satisfy the two requirements of improving the power generating efficiency and increasing the unit capacity of the power plant, it is advantageous that the power plant is composed of a plurality of combined-cycle power generating units, and that these units are operated in a manner in which the units are treated as a single large-capacity unit, i.e., the plant operator can regard the group of the plural units as a single unit.

Heretofore, methods or devices for controlling a single combined-cycle power generating unit have been developed. However, no methods or devices have been developed for controlling a plurality of combined-cycle power generating units treating them as a single unit. Consequently, the present status of art is that the operation, in each power plant, of a number of combined cycle units has to be made according to human judgement of the operator. This, however, is extremely difficult.

Generally, the power demand on the transmission line is allotted to each power plant by a central dispatching office and the allotment to each power plant varies with time. The allotment to each plant is hereinafter referred to as a "target load". An operator of the power plant comprising a plurality of power generating units carries out start-up and shut-down of the units such that the total electric power generated at every instant by the plant as a whole is equal to the target load. It should be noted, in this connection, that one has to wait certain time after a power generating unit is started and before the control of the power becomes possible. Thus, the operator must start the power generating unit at an instant in advance of the instant at which it is desired to commence control of its output by a time interval corresponding to a start-up time period. However, the estimation of the start-up time period is extremely difficult, and this difficulty is further complicated by the fact that the start-up time period is varied depending on whether the gas turbine and the steam turbine of the particular power generating unit are preheated or not, that is whether the power generating unit is in a "hot mode" or a "cold mode". For example, a unit in the hot mode can start generating an electric power earlier than a unit in the cold mode if the two units are started simultaneously.

For this reason, the burden on an operator of the power plant starting a plurality of combined cycle power generating units for meeting the target load is far severer than that on an operator of a plant comprising a single power generating unit.

SUMMARY OF THE INVENTION

An object of the present invention is to provide a method of controlling an electric power plant comprising a plurality of combined-cycle power generating units, each unit including a gas turbine and a steam turbine, in such a manner that a total electric power equal to the target load is generated from the power plant at any particular time instant.

Another object of the invention is to provide a method of operating an electric power plant of the aforementioned construction, wherein the schedule for starting the electric power plant can be automatically determined.

According to the invention, there is provided a machine-implemented method of operating a thermal power generating plant having at least one power generating unit comprising the steps of:

(A) determining, in accordance with a given time point $t_1$ at which the power generating unit is to become capable of being load-controlled and assumed time length $T_1$ for time length of initial load holding TINT, a predicted value $t'_{PI}$ of a time point $t_{PI}$ of parallel-in, a predicted value $t'_{GT}$ of a time point $t_{GT}$ of a gas turbine start; and a predicted value $t'_{INC}$ of a time point $t_{INC}$ of initial load hold completion; and (B) correcting the predicted values $t'_{PI}$, $t'_{GT}$ and $t'_{INC}$ by adding $k(t_1 - t'_{INC})$ to $t'_{PI}$, $t'_{GT}$ and $t'_{INC}$, respectively, k being a given value satisfying $0 < k \leq 1$.

BRIEF DESCRIPTION OF THE DRAWINGS

In the accompanying drawings

DESCRIPTION OF THE PREFERRED EMBODIMENTS

Figure 1:
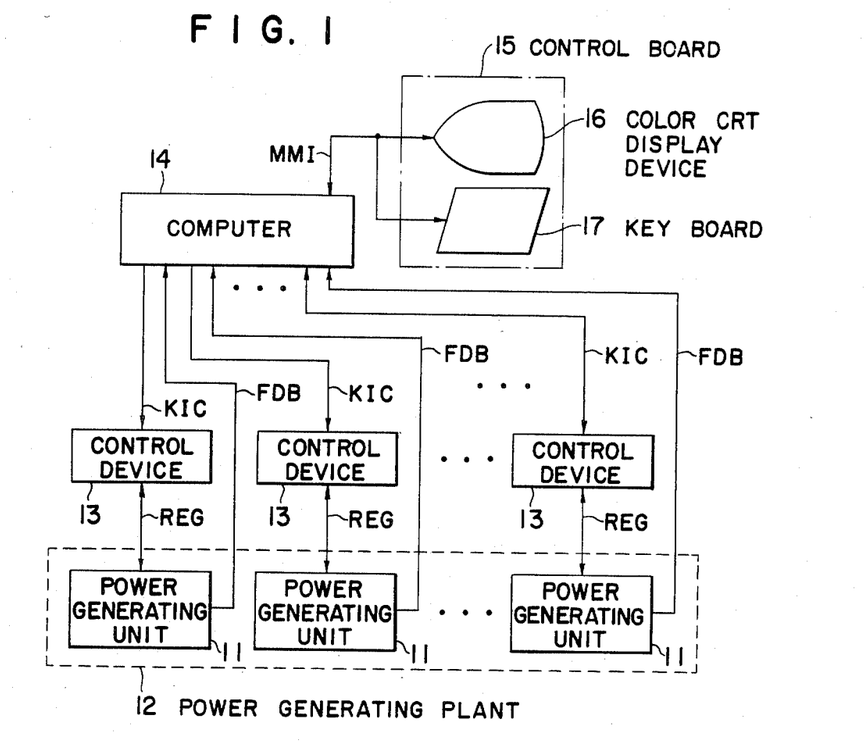
FIG. 1 is a block diagram showing a control system for controlling a power plant comprising a plurality of combined-cycle power generating units in accordance with the present invention.

FIG. 1 illustrates a control system for an electric power plant to which the method of the present invention is advantageously applied. The entire system comprises a power generating plant 12 connected to a power transmission system (not shown) and comprising a plurality of combined-cycle electric power generating units 11 each including a gas turbine and a steam turbine, a plurality of control devices 13 each delivering a control signal REG to the corresponding one of the power generating units 11, a process computer system (hereinafter referred to, simply, as "computer") 14 which delivers a series of starting instructions KIC to the control devices 13 based on feed-back data FDB from the power generating units 11 and data MMI (man-machine interface) from an operator, and an operator's control board 15 for delivering the data MMI to the computer 14. The control board 15 includes a color CRT display device 16 and a key board 17.

The allotment of the electric power to each plant or the target load can be given, from the central dispatching office, in any one of various forms. For instance, it can be given as a continuously varying function or curve. In this case, the instant or time point at which control of each generating unit should become possible must be determined, in accordance with the given curve, either manually or by the use of a computer. In the example which will be described in detail, it is assumed that the target load is given in the form of a stepwise changing function, which can be expressed by the time points at which the target load stepwise changes and the magnitude of the target load over the intervals between successive time points at which the changes occur.

Upon reception of the information, the operator inputs these information by the use of the key board 17, and the values thus inputted are automatically displayed on the display device 16.

Figure 2:
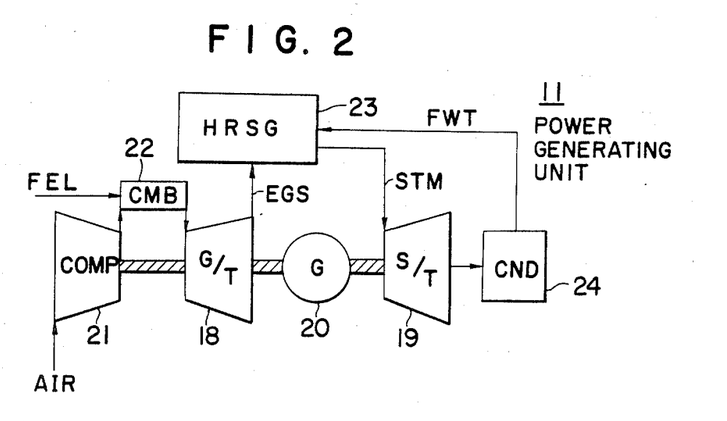
FIG. 2 is a schematic diagram showing the combined-cycle power generating unit.

As shown in FIG. 2, each of the combined-cycle power generating units 11 comprises a gas turbine 18, a steam turbine 19, and an electric generator 20 driven by the two turbines 18 and 19. The gas turbine 18 is rotated by energy generated by combustion in a combustion chamber 22 into which a mixture of fuel FEL and air AIR compressed by a compressor 21 is supplied. On the other hand, the steam turbine 19 is driven by the steam generated in a heat recovery boiler 23 where feed water FWT supplied from a condenser 24 is heated by the exhaust gas EGS delivered from the gas turbine 18.

Figure 3:
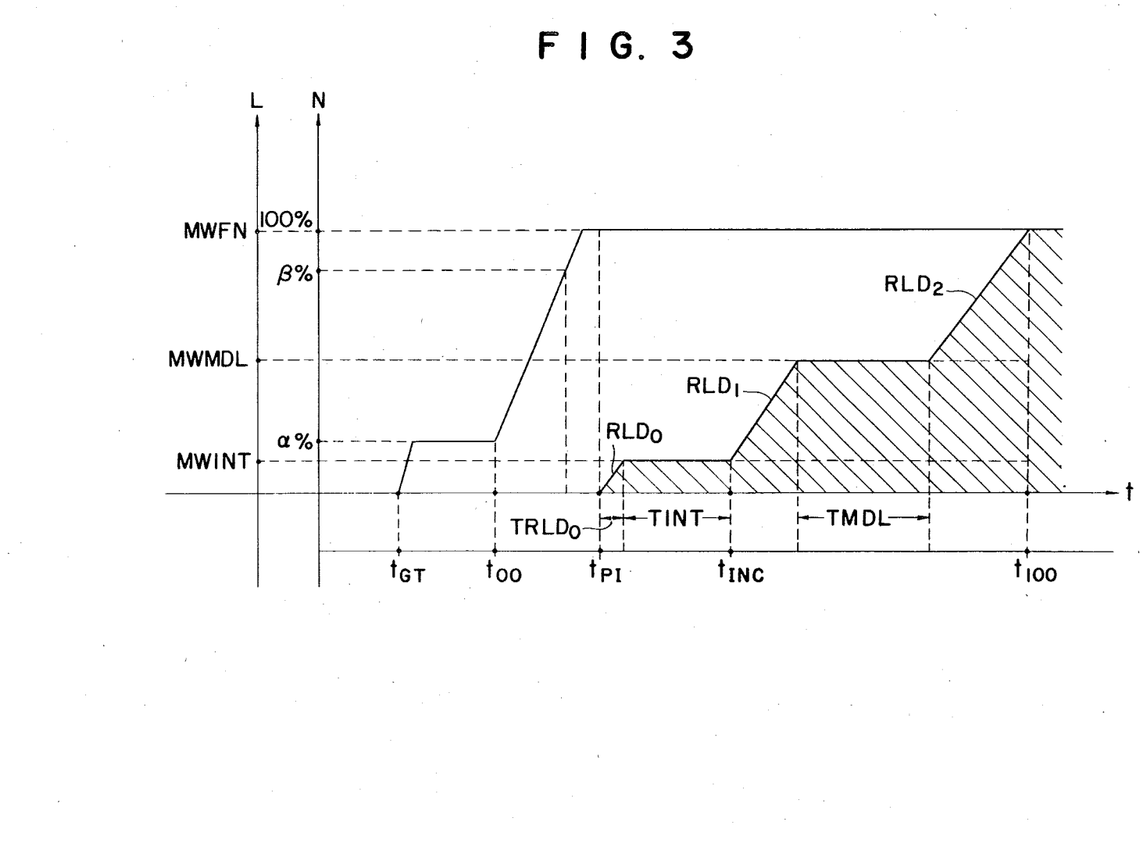
FIG. 3 is a time chart showing starting operation of a single combined-cycle power generating unit.
Figure 4:
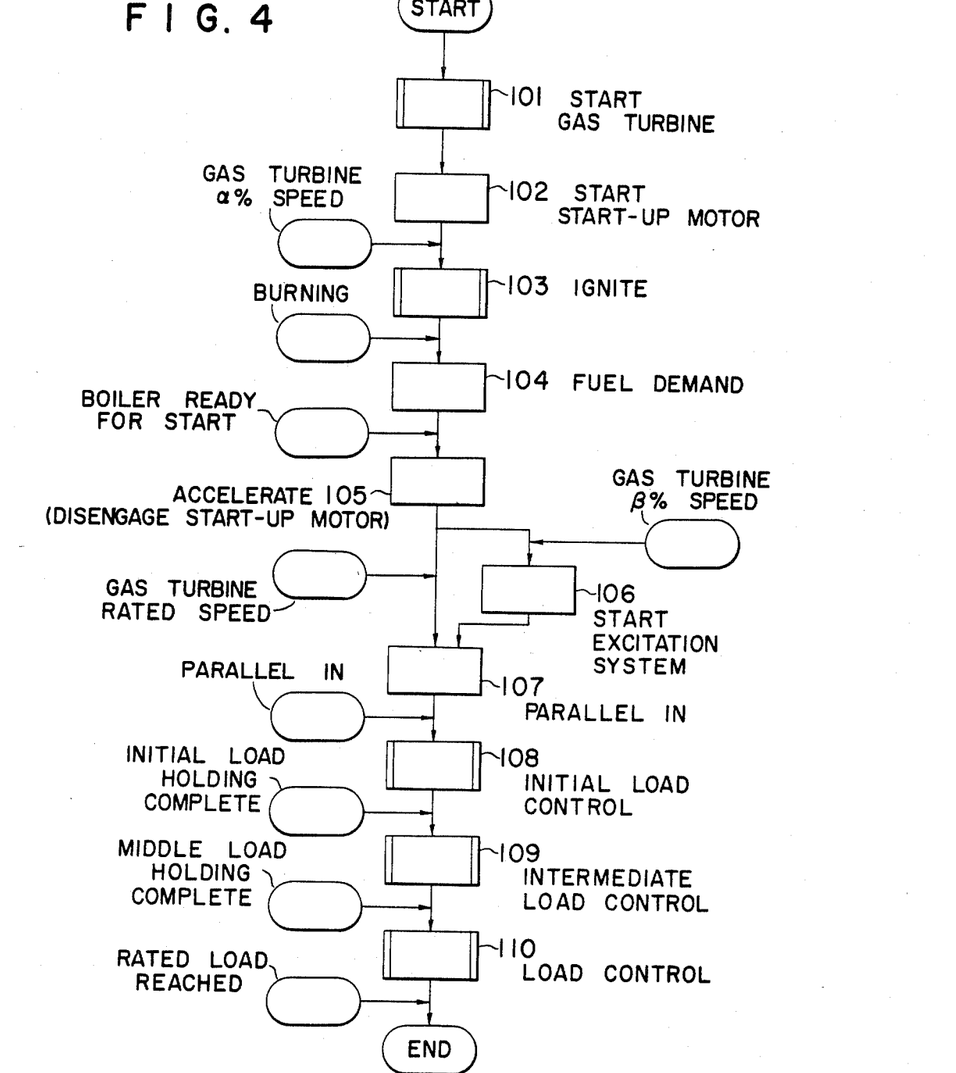
FIG. 4 is a flow chart showing the starting operation of a single unit.

Operations for starting one of the power generating units 11 are shown in FIG. 3, and operation steps carried out in the starting are indicated in a flow chart shown in FIG. 4 wherein a symbol  designates an instruction delivered from the computer 14, a symbol  designates an instruction from the control device 13, and a symbol  designates feed-back data from the power generating plant.

Since the steam turbine 19 is driven by the steam generated by the heat of the exhaust gas EGS delivered from the gas turbine 18, it is apparent that the gas turbine 18 must be started first. FIG. 4 shows that this is accomplished by step 101 in which the computer 14 having made up a starting schedule in accordance with the information MMI and the data FDB delivers a starting instruction for the gas turbine 18.

It is assumed that the starting instruction of the step 101 is delivered at a time point $t_{GT}$ in FIG. 3. When the control device 13 receives the instruction of the step 101, the device 13 starts operation of the start-up motor of the gas turbine 18 in step 102 of FIG. 4. When the rotating speed of the gas turbine 18 goes up to $\alpha\%$ ($\alpha$ is a predetermined value, e.g., 20%) of the rated speed of the gas turbine 18, the computer 14 delivers an ignition (setting on fire) instruction to the control device 13 in a step 103.

Since the compressor 21 which compresses combustion air is driven by the gas turbine 18, the fuel system of the gas turbine 18 cannot be operated without operating the gas turbine 18. For this reason, the start-up motor of the gas turbine 18 is first operated for starting the fuel system, and the ignition instruction is issued when the rotating speed of the gas turbine 18 goes up to $\alpha\%$ of its rated speed and the fuel system becomes ready for the ignition of the gas turbine.

Upon reception of the ignition instruction, the control device 13 ignites the gas turbine and confirms completion of the ignition, i.e., commencement of burning. Furthermore, the control device 13 delivers a fuel demand signal at a step 104, the fuel demand being such as to maintain the aforementioned $\alpha\%$ of the rated speed.

When the metal temperature of the gas turbine goes up to a predetermined warming temperature (at an instant $t_{00}$), and when the heat recovery boiler 23 is ready for start (i.e., its preparation is complete), the control device 13 disengages the start-up motor since this motor is no longer necessary, and accelerates the gas turbine 18 (step 105).

When the rotating speed of the gas turbine goes up to $\beta\%$ of the rated speed ($\beta$ is a predetermined value), the control device 13 starts the excitation system of the generator 20 (step 106).

When the rated speed of the gas turbine 18 is reached, the control device 13 delivers an automatic synchronization signal or instruction to the power generating unit 11 to perform parallel-in or to connect the unit 11 in synchronism with the power transmission system (step 107). Upon this instruction, the voltage, phase, and the frequency of the output of the generator 20 are first made to conform to those of the power transmission system, and then the generator 20 is connected with the power transmission system. Start-up operations of the steam turbine 19 are carried out in parallel with the parallel-in operations and, steam admission, i.e., introduction of steam into the gas turbine 19 is effected substantially simultaneously with the parallel in. It should be noted that the inner metal temperature of the first stage of the turbine 19 at the time of the steam admission is a factor determining parameters used in the subsequent starting schedule of the steam turbine 19.

Upon completion of the parallel-in (at $t_{PI}$ in FIG. 3), the computer 14 executes an initial load controlling step 108 of FIG. 4. In this stage, the load L of the generator 20 is increased at a predetermined rate of change $RLD_0$ to the initial load MWINT and held at this load. The magnitudes of the initial load MWINT, initial load holding period TINT, and the rate $RLD_0$ are all varied in accordance with the inner metal temperature of the first stage of the steam turbine 19 at the starting time thereof, in other words, depending on whether the steam turbine 19 is in a hot mode or in a cold mode. When the steam turbine 19 is in a hot mode, the initial load holding period TINT is shorter, while the rate $RLD_0$ and the initial load MWINT are greater. Conversely, when the steam turbine 19 is in a cold mode, the initial load holding period TINT is longer, while the rate $RLD_0$ and the initial load MWINT are smaller. This is because the thermal stress in the metal should be kept within an allowable range.

The computer 14 calculates the period $TRLD_0$ required for attaining the initial load, initial load holding period TINT, and the terminating time instant $t_{INC}$ of the initial load holding period TINT based on the seedback data FDB from the power generating unit 11, and terminates the step 108 at the instant $t_{INC}$.

The starting operation of the power generating unit 11 then proceeds to a middle or intermediate load controlling step 109. The intermediate load MWMDL, the rate of change $RLD_1$, and the intermediate load holding period TMDL are calculated based on the inner metal temperature of the first stage of the steam turbine 19, in a manner similar to that in which initial load, etc. are determined, i.e., taking account of thermal stress on the metal of the steam turbine, and instructs increase of the load of the unit 11 to the intermediate load MWMDL at the rate $RLD_1$. After expiration of the intermediate load holding period TMDL, the starting operation of the unit 11 proceeds to a step 110 wherein the computer 14 instructs further increase to the rated load MWFN of the unit 11 at the rate of change $RLD_2$, which is also calculated by the computer 14 taking account of the thermal stress of the metal of the steam turbine. When the power generating unit 11 reaches a state where it generates the rated load MWFN, at a time point $t_{100}$, the starting operation of the unit 11 is completed.

Start-up of any particular power generating unit is achieved in a manner described, but it should be noted control of the output of the power generating unit responsive to the variation of the target load becomes possible after the time point $t_{INC}$ at which the initial load controlling step 108 terminates. Although the power generating unit 11 is still in the starting stage even after the time point $t_{INC}$, it is possible to increase or decrease the magnitude of the load of the unit 11 after the time point $t_{INC}$. Thus in the present application, the time point $t_{INC}$ is considered to be a critical instant, at which entry into operation of the generating unit takes place and after which control or variation of the load of the unit is possible. In other words, according to the present invention, the power generating unit 11 is started such that the terminating time point $t_{INC}$ of the initial load holding period is coincident with the time point at which the target load increases.

Figure 5:
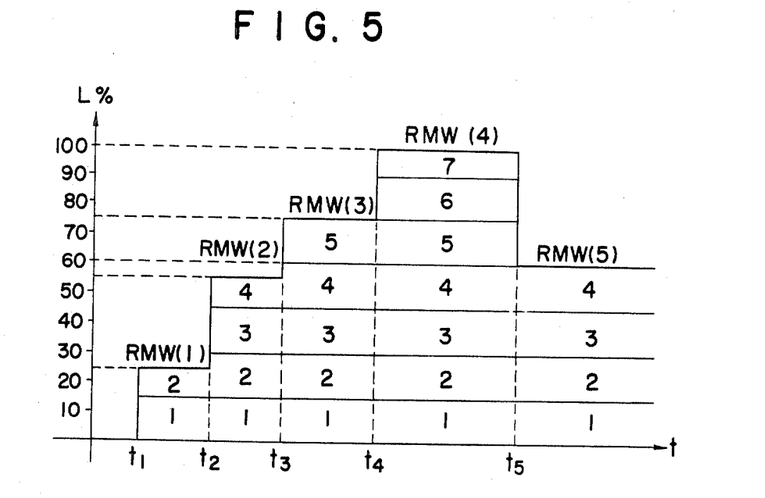
FIG. 5 is a time chart showing variation in time of a target load.

It is assumed that an electric power (i.e., the target load) that is required to be generated from the power plant 12 varies as shown in FIG. 5. More specifically, it is assumed that within the time interval from $t_1$ to $t_2$, the value of the target load RMW(1) (required mega watt) is 25% of the rated load, and within the time interval from $t_2$ to $t_3$, the value of the target load RMW(2) is 55% of the rated load. Likewise, from $t_3$ to $t_4$, the target load RMW(3) is 75% of the rated load, from $t_4$ to $t_5$, the target load RMW(4) is equal to the rated load (100%), and after the time point $t_5$, it is assumed that the target load RMW(5) is maintained at 60% of the rated load.

Furthermore, it is assumed that the number of the units 11 provided in the power plant 12 is seven, and the rated output of each unit 11 is 15% of the rated output of the power plant 12 in view of the fact that $100/7 \div 15$.

When the information concerning the target load values RMW(1) through RMW(5) and the time points $t_1$-$t_5$ is given, e.g., by telephone, from the central dispatching office to the power plant 12, the operator of the power plant 12 inputs the information on these values and the time data by means of the key board 17. In consequence, the information related to the target load and the time data is transferred automatically from the key board 17 to the computer 14 in the form of the data: [RMW(1), $t_1$], [RMW(2), $t_2$], [RMW(3), $t_3$], [RMW(4), $t_4$], [RMW(5), $t_5$], . . . . The computer 14 receiving these data determines the number of the power generating units 11 to be operated and selects the units to be operated at every instant. For instance, for the target load shown in FIG. 5, the number of the power generating units to be operated at the instant (or time point) $t_1$ is two, the number of the same at the instant (or time point) $t_2$ is four, the number of the same at the instant $t_3$ is five, the number at the instant $t_4$ is seven, and the number of the units to be operated at the instant $t_5$ is four. In this example, at the instant $t_1$, one of the two units begins generating the rated output corresponding to 15% of the rated output of the power plant, while the other of the two units begins generating an output corresponding to 10% of the rated output of the power plant, so that the two units begin generating the required value RMW(1) of the target load equal to 25% of the rated output of the power plant. Likewise, at the instant $t_2$, each of the three units among the four units begins generating 15% of the rated output of the power plant, while the remaining one unit among the four units begins generating 10% of the rated output of the power plant, so that the required value RMW(2) of the target load equal to 55% of the rated output of the power plant is delivered from the four units. Similarly, at the instant $t_3$ each of the five units begins generating 15% of the rated output so that the value RMW(3) of 75% rated output is generated from the five units; and at the instant $t_4$, each of the six units begins generating 15% of the rated output while the remaining one unit begins generating 10%; and at the instant $t_5$, each of the four units is operated at the rated output so that the total sum of the outputs (15%×4) is equal to 60% of the rated output of the power plant.

The computer 14 selects the power generating units to be started to meet increase of the target load at $t_1$-$t_4$ and determines starting schedules of the selected power generating units such that the power control of the required number of the units is made possible at the instants of increase of the target load. In doing so, computer 14 determines or calculates starting instants (time points) of these units, and delivers starting instructions for these units at the calculated instants.

Figure 6:
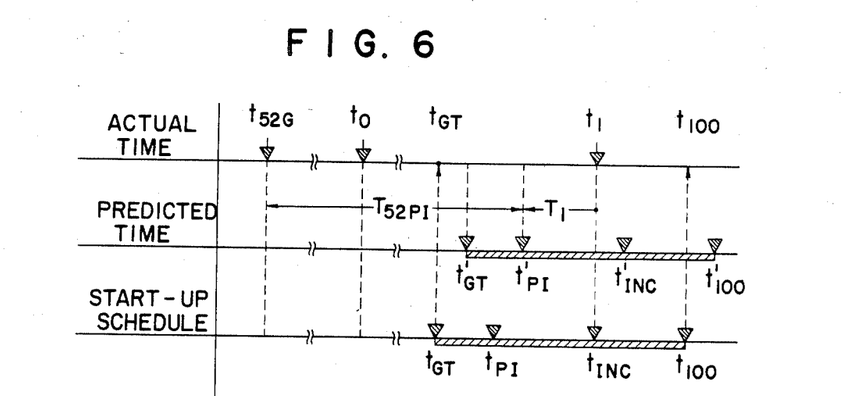
FIG. 6 is a time chart used for explaining the calculation of a starting schedule of a single power generating unit.

FIG. 6 is a diagram used for explaining the procedure for determining the starting instant $t_{GT}$ of a unit 11 in consideration of a target load. It is assumed that the current (present) instant (or time point at which calculation is executed) is $t_0$. At the time point $t_1$, two combined cycle power generating units 11 of the power plant 12 should be brought into a state capable of generating the target load RMW(1). For this to be achieved, the two units must be first selected from the seven units of the power plant. The selection of the units can be made in such a manner that the unit which, at the time of entry into operation, will have been out of operation for the shortest time, is first selected. If simultaneous entry into operation of more than one unit is required, the priority in the selection is in the order of shortness of time for which the unit will have been out of operation. This criterion or standard for selection is particularly useful for selecting the units whose entry into operation is required in a short time. Other criteria for selection can be used instead of or in combination with the above criterion. For instance, the desirability of equalizing the rate of operation may be taken into consideration.

The starting time point $t_{GT}$ of a unit is calculated such that the terminating time point $t_{INC}$ of the initial load holding period TINT coincides with the time point $t_1$. In other words, the starting schedule of the unit 11 is calculated based on the time point $t_1$.

The calculation of the starting schedule is now described in detail.

First, a predicted value $t'_{PI}$ of the parallel-in time point $t_{PI}$ of the power generating unit is calculated by the following equation:

$$t'_{PI} = t_1 - T_1 \tag{1}$$

wherein $T_1$ is an assumed value corresponding to the initial load holding period TINT. Since the initial load holding period TINT of the power generating unit 11 varies as described hereinbefore depending on whether the unit 11 is in a hot mode or in a cold mode and the exact value thereof is not known at the time of calculation, an assumed value $T_1$ is used instead of the initial load holding period TINT during the calculation of the predicted value, and the calculated result is thereafter corrected in a manner later described.

After the calculation of the predicted value $t'_{PI}$, the computer finds out the immediately preceding line-off time point $t_{52G}$ of the power generating unit 11 by referring to the stored record in its storage unit (not specifically shown), and calculates a predicted idle period $T_{52PI}$ for which the generating unit will have been, at the predicted parallel-in time point $t'_{PI}$, out of operation since the immediately preceding line-off time point $t_{52G}$.

$$T_{52PI} = t'_{PI} - t_{52G} \tag{2}$$

The predicted idle period $T_{52PI}$ corresponds to the time length from the previous stop of the steam turbine 19 of the unit 11 to the instant of the present (contemplated) start of the same turbine. The predicted idle period $T_{52PI}$ is a parameter which determines conditions governing steam admission of the steam turbine 19 and also determines whether the steam turbine is in the cold or hot starting mode.

Then the predicted starting time point $t'_{GT}$ of the gas turbine 18 is calculated based on the predicted parallel-in time point $t'_{PI}$ and the metal temperature of the gas turbine 18, and also depending on whether the steam turbine 19 is in the cold starting mode or in the hot starting mode. More specifically, when the metal temperature of the gas turbine 18 is low, a longer warming time is required, during which the rotating speed of the gas turbine 18 is maintained at $\alpha\%$ of the rated speed N of the gas turbine. Conversely, when the metal temperature of the gas turbine 18 is higher, the warming time for the metal of the gas turbine is shorter. For this reason, the time length from the starting of the gas turbine to the parallel-in of the generator 20 is calculated based on the metal temperature of the gas turbine 18 and depending on whether the steam turbine 19 is in the hot starting mode or the cold starting mode, and the predicted starting time point $t'_{GT}$ is calculated from the predicted parallel-in time point $t'_{PI}$. The acceleration rate of the gas turbine 18 is determined depending on whether it is the hot or cold starting mode of the steam turbine 19 such that the acceleration rate is reduced for the cold starting mode, while the acceleration rate is increased for the hot starting mode.

After the calculation of $t'_{GT}$ and $t'_{PI}$, a predicted value $t'_{INC}$ of the completion time point $t_{INC}$ of the initial load holding period TINT is calculated. This calculation is accomplished by first calculating a load rising period $TRLD_0$ which is required for increasing the load L of the power generating unit to the initial load MWINT, and also the initial load holding period TINT, and then utilizing these values in the following equation:

$$t'_{INC} = t'_{PI} + TRLD_0 + TINT \tag{3}$$

The above mentioned calculation of the load rising period $TRLD_0$ and the initial load holding period TINT is performed based on the steam condition and the metal temperature condition of the steam turbine 19 at the predicted parallel-in time point $t'_{PI}$, that is, at the steam admission time of the steam turbine 19, and by referring to a given mismatch chart stored in the computer 14. For instance, when the metal temperature of the steam turbine 19 is low placing the steam turbine in the cold starting mode, starting parameters after the steam admission must be reduced for avoiding thermal fatigue of the metal. More specifically, the load rising period $TRLD_0$ and the initial load holding period TINT are increased, and the rates $RLD_0$, $RLD_1$, $RLD_2$, initial load MWINT, and the intermediate load MWMDL are all reduced. Conversely, when the metal temperature of the steam turbine 19 is high, the load rising period $TRLD_0$ and the initial load holding period TINT are reduced and the rates $RLD_0$, $RLD_1$, $RLD_2$, the initial load MWINT, and the intermediate load MWMDL are all increased.

Thus when the predicte initial load hold completion time point $t'_{INC}$ is calculated from the equation (3), the metal temperature condition and the steam condition of the steam turbine 19 at the predicted parallel-in time point $t'_{PI}$ are first determined, then the load rising period $TRLD_0$ and the initial load holding period TINT are round out from these conditions, and then the predicted initial load hold completion time point $t'_{INC}$ is calculated by the equation (3).

The metal temperature condition of the steam turbine 19 at the predicted parallel-in time point (the steam admission time point) $t'_{PI}$ of the steam turbine 19 is determined by the first stage inner metal temperature $H_{FSI}$ which is a function of the predicted idle period $T_{52DI}$ as follows.

$$H_{FSI} = f_1(T_{52PI}) \tag{4}$$

This function $f_1$ is ordinarily a monotonously reducing function showing that the first stage inner metal temperature $H_{FSI}$ is reduced as the predicted idle period $T_{52PI}$ of the steam turbine 19 increases. The function $f_1$ varies depending on the kind and type of the steam turbine 19, and accordingly when it is desired to be accurate, the function is determined from results of actual field tests.

The steam condition at the predicted parallel-in time point (the steam admission time point) $t'_{pI}$ is determined from the temperature $H_{MST}$ and the pressure $H_{MSP}$ of the main steam generated from the boiler 23 at that instant. The main steam temperature $H_{MST}$ and the main steam pressure $H_{MSP}$ are calculated in the computer 14 based on the plant parameters such as the inputs of the boiler 23, that is, the heat quantity of the exhaust gas EGS and the flow rate of the feed water FWT supplied from the condenser 24. More specifically, curves indicating the variations of the main steam temperature $H_{MST}$ and the main steam pressure $H_{MSP}$ after the starting time point of the gas turbine for the hot and cold starting modes, are stored in advance in the computer 14 and the steam condition at the predicted parallel-in time point $t'_{PI}$ is determined with reference to these curves.

Upon determining the main steam temperature $H_{MST}$ and the main steam pressure $H_{MSP}$ at the predicted parallel-in time point $t'_{PI}$, the first stage outlet steam temperature $H_{FSO}$ which would result when the steam is admitted under this steam condition is determined in accordance with the thermodynamic characteristic of the turbine, and the mismatch temperature $H_{MIS}$ of the steam turbine 19 defined by the difference between the first stage outlet steam temperature $H_{FSO}$ and the first stage inner metal temperature $H_{FSI}$ is calculated as follows.

$$H_{FSO} = f_2(H_{MST}, H_{MSP}) \quad (5)$$

$$H_{MIS} = H_{FSO} - H_{FSI} \quad (6)$$

wherein $f_2$ denotes a function representing the thermodynamic characteristic of the turbine.

Where the mismatch temperature $H_{MIS}$ is in a certain range causing substantially no thermal fatigue in the metal of the steam turbine 19, the initial load holding period TINT may be reduced and the load change rate $RLD_0$ may be steep, thus reducing the load rising period $TRLD_0$. Conversely, where the mismatch temperature $H_{MIS}$ is outside of the above-mentioned range, a suitable value of the initial load holding period TINT adapted for avoiding an excessive thermal fatigue of the metal of the steam turbine 19 must be selected, and likewise the load change rate $RLD_0$ must be reduced.

When the mismatch temperature $H_{MIS}$ is determined, the load rising period $TRLD_0$ and the initial load holding period TINT are determined based on the mismatch temperature $H_{MIS}$ with reference to a mismatch chart stored in the computer 14, and the predicted initial load hold completion time point $t'_{INT}$ is calculated by the equation (3).

In addition, if it is desired the initial load MWINT, another load changing rate $RLD_1$, intermediate load holding period TMDL, intermediate load MWMDL, still another load changing rate $RLD_2$, and the like may be calculated based on the mismatch temperature $H_{MIS}$, and the predicted start completion time point $t'_{100}$ may be calculated from these values.

When the predicted starting time point of the gas turbine 18 (or predicted starting time point of the power generating unit) $t'_{GT}$, the predicted parallel-in time point $t'_{PI}$ of the generator 20 (or steam admission time point of the steam turbine 19), the predicted initial load hold completion time point $t'_{INC}$ and the predicted start completion time point $t'_{100}$ are all determined as described above, it means that the predicted start schedule of one of the power generating units 11 is determined.

The reason why the predicted initial load hold completion time $t'_{INC}$ differs from the time point $t_1$ of the target load despite the fact that the calculation has been carried out with reference to the time point $t_1$ is that the assumed value $T_1$ has been used instead of the actual initial load holding period TINT. That is, the difference is due to the error of the assumed value $T_1$ with reference to TINT.

If the difference between the target load charging time point $t_1$ and the predicted initial load hold completion time point $t'_{INC}$ is less than a predetermined value $\delta$, the calculation of the starting schedule is terminated. However, if the difference is larger than $\delta$, the predicted schedule is corrected by shifting such that $t'_{INC}$ approaches $t_1$. For this to be achieved the absolute value $|t_1 - t'_{INC}| = \epsilon$ is determined, and the predicted initial load hold completion time point $t'_{INC}$ is again shifted for a time interval $k\epsilon$ (wherein $0 < k \leq 1$). With the predicted completion time point $t'_{INC}$ thus shifted, and the assumed time length $T_1$ corrected, all of the calculations made in accordance with the result of the assume time length $T_1$ are repeated until the difference between the time points $t_{INC}$ and $t'_{INC}$ becomes less than $\delta$. If, however, the difference does not become less than $\delta$ even after N-times repetition of the calculations, further calculations thereof are omitted. In this manner ultimate values of the starting time point $t_{GT}$, the parallel-in time point $t_{PI}$, the initial load hold completion time point $t_{INC}$, and the start completion time point $t_{100}$ are determined, and therefore the ultimate starting schedule of the power generating unit 11 is determined.

Figure 7:
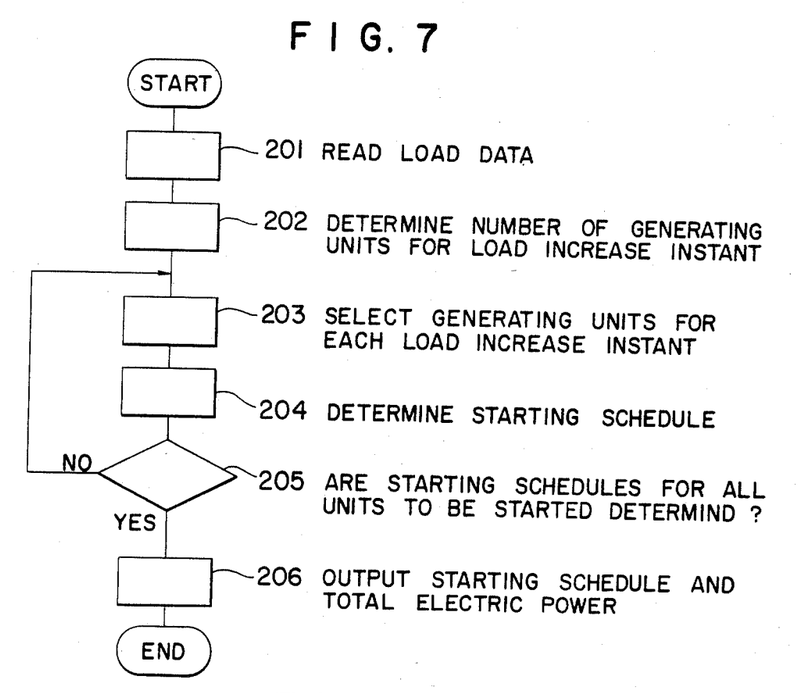
FIG. 7 is a flow chart showing operation for determining starting schedules for the entire power generating plant.

FIG. 7 is a flow chart showing operation steps to be carried out by the computer 14 after the data related to the target load have been received. The computer 14 first reads the data related to the target load, which are in the form of indicating values of the target load and time points into its storage device (step 201), and determines the number of the power generating units to be operable at each time point for generating the target load. For instance, the number of the units to be operable should be two at the time point $t_1$, four at the time point $t_2$, five at $t_3$, seven at $t_4$, and four at $t_5$ (step 202). Then the computer 14 selects the power generating units which should be capable of load control and should stop it at the load changing time points (step 203). For instance, for the load change at $t_1$ two units 11 capable of starting in short periods, i.e., those in the hot mode, are selected.

Then the starting schedule is determined for each of the power generating units 11 to be started (step 204). This calculation is carried out as described hereinbefore with reference to FIG. 6, and when the starting schedules for all of the units to be started are calculated (step 205), these starting schedules and the electric power (predicted value) P to be generated by the power plant 12 are displayed on the display device 16 (step 206).

Figure 8:
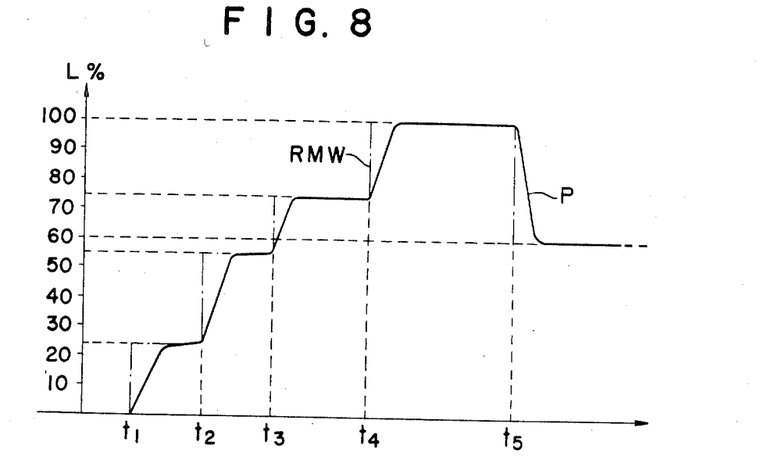
FIG. 8 is a time chart showing variation in time of a predicted total electric power generated by the entire power generating plant.

The electric power P to be generated by the power plant 12 does not coincide completely with the target load RMW shown in FIG. 8 because at the time points when the target load RMW varies, each of the power generating units to be started is capable of load control, but is not generating the rated electric power.

The starting schedules for the individual power generating units are usually different from each other. However, it may sometimes happen that the parallel-in time point $t_{GT}$ of a unit substantially coincides with that of another unit. Since the steam admission of the steam turbine 19 in one unit must be accomplished simultaneously with the parallel-in operation of the same unit, the aforementioned coincidence of the parallel-in time points $t_{GT}$ of two or more units entails a severe burden on the operator of the power plant. To alleviate such concentration of burden, the parallel-in time point $t_{GT}$ calculated for one unit and hence the starting schedule for the same unit can be shifted from that of the other unit so that the concurrence of the parallel-in operations of two or more units is avoided.

The aforementioned shifting of the starting schedule and the starting time point $t_{GT}$ can be carried out by the computer 14. More specifically the computer 14 automatically delivers a message for drawing attention of the operator to the concurrence of the starting operations, and upon approval by the operator, the computer shifts the starting time point $t_{GT}$ of one or more units as described above.

The stopping operation of the power generating unit 11 may be carried out simply in a manner such that the computer 14 first issues an instruction for reducing the load of the unit down to a predetermined value, and then issues a stopping instruction. When the computer issues a stopping instruction at a time point $t_5$, the operation of the power generating unit 11 designated by the instruction terminates some time after the time point $t_5$.

According to the present invention, since the starting schedules for the units to be started in accordance with the target load variation have been calculated beforehand, the units can be started in a manner appropriate for the target load variation. Furthermore, the total electric power generated from these units for every instant can be calculated from the starting schedules, so that the power plant comprising these units can be treated in operation as a single unit power plant.

Since the starting schedules are determined in advance by calculation, it is possible to modify the schedules within a range allowable for the accomplishment of the target load when execution of operations following exactly the schedules is considered difficult.

With all of the above described advantageous features, the power plant made of a plurality of combined-cycle power generating units can be treated in operation as a single unit power plant, and the advantages inherent to the combined-cycle power generating units can be fully exploited.

What is claimed is:

1. A machine-implemented method of operating a thermal power generating plant having at least one power generating unit comprising the steps of:
    (A) determining, in accordance with a given time point $t_1$ at which the power generating unit is to become capable of load control and assumed time length $T_1$ for time length of initial load holding TINT, a predicted value $t'_{PI}$ of a time point $t_{PI}$ of parallel-in, a predicted value $t'_{GT}$ of a time point $t_{GT}$ of a gas turbine start; and a predicted value $t'_{INC}$ of a time point $t_{INC}$ of initial load hold completion; and
    (B) correcting the predicted values $t'_{PI}$, $t'_{GT}$ and $t'_{INC}$ by adding $k(t_1 - t'_{INC})$ to $t'_{PI}$, $t'_{GT}$ and $t'_{INC}$, respectively, k being a given value satisfying $0 < k \leq 1$.

2. A method as set forth in claim 1, wherein $T_1$ is corrected in accordance with the correction of $t'_{PI}$ and $t'_{GT}$, and the steps (A) and (B) are repeated until the difference $(t_1 - t'_{INC})$ becomes smaller than a predetermined value.

3. A method as set forth in claim 2, the repetition of the steps (A) and (B) is terminated when the number of repetition becomes a predetermined number.

4. A method as set forth in claim 1, wherein the determination of $t'_{INC}$ at the step (A) is performed by:
    determining, in accordance with $t'_{PI}$ and a time point $T_{52G}$ of the latest line-off, a predicted value $H_{FSI}$ of the first stage inner metal temperature at the time point $t'_{PI}$;
    determining, in accordance with given parameters of the plant, a predicted value $H_{FSO}$ of the first stage outlet steam temperature at the time point $t'_{PI}$;
    determining, in accordance with $H_{FSI}$ and $H_{FSO}$, a time length $TRLD_0$ of load rising period, and a time length TINT of initial load holding; and
    determining $t'_{INC}$ from $t'_{PI}$, $TRLD_0$ and TINT.

5. A method as set forth in claim 4, wherein $H_{FSO}$ is determined by:
    determining a main steam temperature $H_{MST}$ and a main steam pressure $H_{MSO}$ at the time point $t'_{PI}$, from given parameters of the plant; and
    determining $H_{FSO}$ from $H_{MST}$ and $H_{MSO}$ in accordance with a function representing the thermodynamic characteristic of the turbine.

6. A method as set forth in claim 4, wherein $TRLD_0$ and TINT are determined by:
    determining a mismatch temperature $H_{MIS}$ from $H_{FSO}$ and $H_{FSI}$ by subtracting $H_{FSI}$ from $H_{FSO}$; and
    determining $TRLD_0$ and TINT from $H_{MIS}$ in accordance with a given mismatch chart stored in a computer system.

7. A machine-implemented method of operating a thermal generating plant comprising a plurality of power generating units comprising the steps of:
    (I) providing a target load schedule;
    (II) determining, in accordance with the target load schedule, a time point at which there should occur entry into operation of a power generating unit;
    (III) selecting a power generating unit as one entering into operation at the time point determined at the step (II);
    (IV) determining a time schedule of start up of the power generating unit selected at the step (III); and
    (V) implementing the start-up operation of the selected power generating unit in accordance with the time schedule of start-up determined at the step (IV).

8. A method as set forth in claim 7, wherein said step (III) of selecting a power generating unit comprises selecting the power generating unit which, at the time of the entry into operation, will have been out of operation for the shortest time.

9. A method as set forth in claim 7, further comprising the steps of:
    (VI) determining, in accordance with the target load schedule, a time point at which there should occur line off of a power generating unit;
    (VII) selecting a power generating unit as one to be shut down at the time point determined at the step (VI); and
    (VIII) shutting down the selected power generating unit at the time point determined at the step (VI).

10. A method as set forth in claim 7, wherein said step (IV) of determining a time schedule comprises the steps of:
    (A) determining, in accordance with a given time point $t_1$ at which the power generating unit is to become capable of load control and assumed time length $T_1$ for time length of initial load holding TINT, a predicted value $t'_{PI}$ of a time point $t_{PI}$ of parallel-in, a predicted value $t'_{GT}$ of a time point $t_{GT}$ of a gas turbine start; and a predicted value $t'_{INC}$ of a time point $t_{INC}$ of initial load hold completion; and (B) correcting the predicted values $t'_{PI}$, $t'_{GT}$ and $t'_{INC}$ by adding $k(t_1 - t'_{INC})$ to $t'_{PI}$, $t'_{GT}$ and $t'_{INC}$, respectively, k being a given value satisfying $0 < k \leq 1$.

11. A method as set forth in claim 10, wherein $T_1$ is corrected in accordance with the correction of $t'_{PI}$ and $t'_{GT}$, and the steps (A) and (B) are repeated until the difference $(t_1 - t'_{INC})$ becomes smaller than a predetermined value.

12. A method as set forth in claim 10, the repetition of the steps (A) and (B) is terminated when the number of repetition becomes a predetermined number.

13. A method as set forth in claim 10, wherein the determination of $t'_{INC}$ at the step (A) is performed by:
    determining, in accordance with $t'_{PI}$ and a time point $T_{52G}$ of the latest line-off, a predicted value $H_{FSI}$ of the first stage inner metal temperature at the time point $t'_{PI}$;
    determining, in accordance with given parameters of the plant, a predicted value $H_{FSO}$ of the first stage outlet steam temperature at the time point $t'_{PI}$;
    determining, in accordance with $H_{FSI}$ and $H_{FSO}$, a time length $TRLD_0$ of load rising period, and a time length TINT of initial load holding; and
    determining $t'_{INC}$ from $t'_{PI}$, $TRLD_0$ and TINT.

14. A method as set forth in claim 13, wherein $H_{FSO}$ is determined by:
    determining a main steam temperature $H_{MST}$ and a main steam pressure $H_{MSO}$ at the time point $t'_{PI}$, from given parameters of the plant; and
    determining $H_{FSO}$ from $H_{MST}$ and $H_{MSO}$ in accordance with a function representing the thermodynamic characteristic of the turbine.

15. A method as set forth in claim 13, wherein $TRLD_0$ and TINT are determined by:
    determining a mismatch temperature $H_{MIS}$ from $H_{FSO}$ and $H_{FSI}$ by subtracting $H_{FSI}$ from $H_{FSO}$; and
    determining $TRLD_0$ and TINT from $H_{MIS}$ in accordance with a given mismatch chart stored in a computer system.

* * * * *